US011073596B1

(12) United States Patent
Covaliov et al.

(10) Patent No.: US 11,073,596 B1
(45) Date of Patent: Jul. 27, 2021

(54) METHOD FOR LOCATING SIGNAL SOURCES IN WIRELESS NETWORKS

(71) Applicant: Ookla, LLC, Los Angeles, CA (US)

(72) Inventors: Andrei Covaliov, North Bend, WA (US); Matthew Knebl, Aliso Viejo, CA (US); Artem Koltsov, Grants Pass, OR (US)

(73) Assignee: Ookla, LLC, Los Angeles, CA (US)

( * ) Notice: Subject to any disclaimer, the term of this patent is extended or adjusted under 35 U.S.C. 154(b) by 0 days.

(21) Appl. No.: 17/248,199

(22) Filed: Jan. 14, 2021

Related U.S. Application Data

(60) Provisional application No. 63/001,003, filed on Mar. 27, 2020, provisional application No. 63/199,622, filed on Jan. 13, 2021.

(51) Int. Cl.
| | |
|---|---|
| *G01S 5/14* | (2006.01) |
| *H04W 64/00* | (2009.01) |
| *G01S 5/12* | (2006.01) |
| *H04W 24/10* | (2009.01) |
| *G01S 5/02* | (2010.01) |

(52) U.S. Cl.
CPC .............. *G01S 5/14* (2013.01); *G01S 5/0268* (2013.01); *G01S 5/12* (2013.01); *H04W 24/10* (2013.01); *H04W 64/003* (2013.01)

(58) Field of Classification Search
CPC ....... H04W 64/00; H04W 4/023; H04W 4/02; H04W 24/02; H04W 4/029; H04W 4/33; H04W 64/003; H04W 64/006; H04W 4/026; H04W 24/10; G01S 5/0257; G01S 5/0205; G01S 1/20; G01S 5/02; G01S 5/10; G01S 5/0221; G01S 5/0268; G01S 5/26; G01S 5/14; G01S 5/12
See application file for complete search history.

(56) References Cited

U.S. PATENT DOCUMENTS

| | | | |
|---|---|---|---|
| 9,942,815 B1* | 4/2018 | Govindassamy | H04B 17/318 |
| 2003/0003924 A1* | 1/2003 | Lin | H04W 64/00 455/456.1 |
| 2004/0248589 A1 | 12/2004 | Gwon et al. | |
| 2013/0053056 A1* | 2/2013 | Aggarwal | H04W 4/029 455/456.1 |
| 2016/0170004 A1 | 6/2016 | Kim et al. | |
| 2017/0368411 A1* | 12/2017 | Komatsu | A63B 24/0021 |
| 2020/0249311 A1* | 8/2020 | Wirola | G01S 5/0205 |

OTHER PUBLICATIONS

"Timing Advance and Android smartphones" by Horn, archived on Sep. 3, 2019 (https://web.archive.org/web/20190903225936/https://people.csail.mit.edu/bkph/cellular_repeater_TA.shtml) (Year: 2019).*
International Search Report issued in International Application No. PCT/US2021/070309 dated Jun. 4, 2021.

* cited by examiner

*Primary Examiner* — Daniel Lai
(74) *Attorney, Agent, or Firm* — Vos-IP, LLC

(57) ABSTRACT

A method of estimating the position of a wireless transmitter comprising: collecting a plurality of wireless measurements between a transmitter and a receiver; drawing a buffer circle around each measurement, having a radius defined by the timing advance delay measurements; plotting a plurality of buffer circles and identifying intersection points for adjacent measurements only; estimating the position based on the intersection of delay measurements from said plurality of wireless measurements.

17 Claims, 16 Drawing Sheets

METHOD FOR LOCATING SIGNAL SOURCES IN WIRELESS NETWORKS

CROSS-REFERENCE TO RELATED APPLICATIONS

This application claims the benefit of U.S. Provisional Patent Application No. 63/001,003 filed on Mar. 27, 2020, and U.S. Provisional Patent Application No. 63/199,622 filed on Jan. 13, 2021, with the United States Patent and Trademark Office, the contents of which are incorporated herein by reference in their entirety.

FIELD OF INVENTION

The inventions herein are related to identifying and estimating the geographic location of a transmitter in a wireless network by analyzing a plurality of measurements from at least one wireless device and using delay measurements and known coordinates of the wireless device to estimate the position of the transmitter.

BACKGROUND OF THE INVENTION

Modern wireless networks typically consist of a number of wireless base stations in a variety of stationary and moving locations. Wireless networks typically consist of a number of wireless base stations that communicate with mobile devices. Typically, the wireless base stations and mobile devices both contain transceivers for two-way communication. In modern wireless systems, the timing of transmissions between transmitters and receivers is tightly controlled to reduce interference in the shared radio spectrum.

The location of wireless network transmitting equipment is of great interest to many parties. For example, wireless network operators are interested in where competing networks have deployed wireless base station equipment. Wireless base stations are devices which provide connection between mobile phones and the wider telephone network, via radio waves transmitted or received through antennas, and typically, a wireless base station includes several transceivers and/or transmitters, where one transmitter transmits in a different direction than another, thus providing greater coverage from a single point. This information can help improve decision making regarding location and prioritization of their own new wireless transceivers. For example, an operator may learn that a competitor has built wireless base stations in an area that is not currently covered by their own network, and therefore may decide to build wireless base stations in that area to remove the competitor's service advantage. Additionally, companies that provide infrastructure, such as a cellular tower (which holds the transceivers), to wireless network operators, such as tower owners and companies that secure rooftop rights for leasing to wireless network operators, are interested in knowing where operators have deployed base stations, so they can identify areas with a potential unmet need for increased coverage or capacity, or to identify potentially underutilized assets such as a cellular tower structure only utilized by one network operator, which may also be beneficial to other operators. Additionally, building owners and tenants may be interested in knowing where the wireless network infrastructure lies in relation to their property, for example to estimate if coverage will be good or bad there on any individual network (or all networks).

There is an inherent delay between transmission and reception of a wireless signal regardless of the medium used. In wireless networks, the medium is space and the factors that cause delay are either the medium itself (free space), obstructions in the path between the transmitter and the receiver (causing reflection, refraction, etc.) or the distance between the transmitter and receiver. In order to achieve communication synchronization, wireless signals are transmitted in advance in order to account for the incurred reception delay. This early transmission is measured in increments of predefined time periods, a delay interval, for example Timing Advance ("TA"), in cellular networks. Wireless networks monitor the time difference between transmission and reception of signals continuously. If a wireless signal arrives too early, the transmitters are instructed via a lower TA offset, to send the signal later and vice versa. Mobile devices can record these TA values using an installed application along with the geographic location (latitude, longitude, altitude) where the TA value measurements were collected and the identification of wireless signal sources (collectively the TA data is the geographic location and the TA value). Thus, a single device, moving from point A to point B, could capture and record several different TA data, as each measurement would yield a different geographic location and possibly a different TA value. The collection of measurements is then utilized to better identify the location of the wireless base station (transmitter).

Applicant has created new and useful methods to improve the identification of and positioning of transceiver base stations through the use of delay measurement data, such as TA values, and TA data which includes the geographic location.

SUMMARY OF THE INVENTION

The methods herein propose solutions for identifying the geographic location of wireless transmitters in a network, based on wireless signal measurements collected by wireless devices serviced by the network. This is useful, for example, to estimate the location of one or more wireless transmitters including wireless network base stations, cellular sites, transceiver stations, wireless towers, etc.

The invention will achieve better detection accuracy and precision of geographic location of wireless transmitters compared to current methods which rely only on received signal level values and are impaired by signal fading, penetration loss, path obstruction, low spatial diversity of measurements, etc.

The features of the embodiments herein include an application running on a mobile device capable of collecting the device's geographic location and extensive wireless network information. Data collected from-one or more devices is analyzed using the methods herein to determine the location of wireless network base stations, and in certain embodiments, in an iterative fashion to improve the precision of identifying the location of the transmitter.

In a preferred embodiment a method of estimating the position of a wireless tower comprising: (a) collecting a plurality of wireless measurements such as TA data, between a transmitter and a receiver, and collecting the timing advance (TA) between the transmitter and the receiver; (b) drawing a buffer circle around the receiver with the circle having a radius equal to $$\frac{1}{2} \times TA[\text{unit}] \times x \left[ \frac{\text{meters}}{\text{unit}} \right];$$

(c) extracting intersection points between adjacent wireless measurements; (d) identifying a cluster of intersection points from step (c); (e) identifying the cluster with the highest number of intersection points; (f) generating a polygon corresponding to the cluster from step (e); (g) extracting a center from the polygon of step (f); (h) circumscribing the polygon from step (f); and (i) determining the initial estimated location of the wireless tower, corresponding to a location within the circle.

In a further embodiment, the method further comprising wherein the intersection points have an inter-point distance equal to a threshold D (distance) and minimum of M points (measurements).

In a further embodiment, the method wherein thresholds D and M are set to values small enough to group densely located intersection points.

In a further embodiment, the method wherein the values for D and M were found empirically to be around D=30 meters and M=5 points in rural areas and around D=10 meters and M=10 points in suburban and urban areas, respectively.

In a further embodiment, the method further comprising the steps: (j) wherein the determined location from step (i) is set as the initial estimated location, calculate the minimum distances from this location to all the buffer circles; (k) shifting the initial location by a distance D and an angle A to a new location and calculating the distances to all the buffer circles; (l) comparing the calculated distances between step (j) and step (k); and (m) setting the new location as the next estimated location where the new location has a shorter distance than the previously estimated location.

In a further embodiment, the method wherein in step (m), the new location further measures a signal level and modifies the new location based upon a measured signal level.

In a further preferred embodiment, a method of estimating the position of a wireless transmitter comprising: (a) collecting a plurality of wireless measurements between a transmitter and a receiver; and (b) estimating the position based on the intersection of delay measurements from said plurality of wireless measurements.

In a further embodiment, the method wherein the intersection of delay measurements is defined by drawing a buffer circle around a wireless measurement, with the radius of the circle defined as $$\frac{1}{2} \times TA[\text{unit}] \times x \left[ \frac{\text{meters}}{\text{unit}} \right]$$

and identifying an intersection point between two measurements collected adjacent to one another.

In a further embodiment, the method wherein adjacent means adjacent in time or in location.

In a further embodiment, the method wherein the estimated position is estimated by identifying a cluster of intersections and circumscribing a circle around a polygon created from the cluster of intersections, wherein the estimated position is within the circumscribed circle.

In a further embodiment, the method wherein the estimated position is estimated by plotting a location point within the circle.

In a further embodiment, the method wherein the plotted location point is plotted to create the shortest distance to each of the intersections within the circle.

In a further embodiment, a method of estimating the position of a wireless transmitter, for example, a base station which could be on a tower, rooftop, streetlight or billboard, comprising: collecting a plurality of wireless measurements between a transmitter and a receiver; drawing a buffer circle around each measurement, having a radius defined by the timing advance delay measurements; plotting a plurality of buffer circles corresponding to the plurality of wireless measurements and identifying at least one intersection point for at least two adjacent measurements; estimating the position based on the intersection of delay measurements from said plurality of wireless measurements.

The method wherein only the adjacent measurements are utilized in identifying at least one intersection point.

The method wherein the receiver is a mobile device.

In a further preferred embodiment, a method of estimating the position of a wireless transmitter comprising the steps of: (a) collecting a plurality of wireless measurements between the wireless transmitter and a receiver, said wireless measurements comprising a delay measurement (TA value) between the transmitter and the receiver and a receiver location; (b) drawing a buffer circle around the receiver location, with the buffer circle having a radius equal to $$\frac{1}{2} \times TA[\text{unit}] \times x \left[ \frac{\text{meters}}{\text{unit}} \right],$$

where x represents the distance measurement for each unit of TA value; (c) extracting an intersection point between an adjacent wireless measurement; (d) identifying at least one cluster of intersection points from step (c); (e) identifying a cluster with the highest number of intersection points; and (f) determining an initial estimated location of the wireless transmitter from the cluster with the highest number of intersection points.

In a further embodiment, the method further comprising the steps of: (e1) immediately after step (e), generating a polygon corresponding to the cluster with the highest number of intersection points from step (e); (e2) extracting a center from the polygon of step (e1); (e3) circumscribing the polygon; and (e4) determining an initial estimated location of the wireless transmitter, corresponding to a location within the circumscribed polygon.

In a further embodiment, the method further comprising wherein the intersection points have an inter-point distance equal to a threshold D and a minimum of M points.

In a further embodiment, the method wherein the values for D and M are D=30 meters and M=5 points.

In a further embodiment, the method wherein the values for D and M are D=10 meters and M=10 points.

In a further embodiment, the method wherein the TA value is modified based on the hardware or software of the receiver.

In a further embodiment, the method wherein the TA value reported by the receiver is specific to a device manufacturer, chipset, and software release, wherein a unique profile normalizes the TA value reported.

In a further embodiment, the method further comprising the steps: (e5) calculating the minimum distances from the initial estimated location to all the buffer circles within the cluster; (e6) shifting the initial estimated location by a distance D and an angle A to a new location and recalculating the distances to all the buffer circles within the cluster; (e7) comparing the calculated distances between step (e5)

and step (e6); and (e8) setting a new location where the new location has a shorter distance than the initial estimated location.

In a further embodiment, the method wherein the plurality of wireless measurements includes a signal level.

In a further embodiment, the method wherein in step (e8) the new location further measures a signal level and modifies the new location based upon a measured signal level.

In a further preferred embodiment, the method wherein the polygon is drawn by connecting the intersection points in said cluster having the highest number of intersection points.

In a further preferred embodiment, a method of estimating the position of a wireless transmitter comprising: (a) collecting a plurality of wireless measurements between a transmitter and a receiver, comprising a position and a TA value; (b) for each of the plurality of wireless measurements, drawing a buffer circle around the position of the receiver, wherein the buffer circle has a radius equal to $$\frac{1}{2} \times TA[\text{unit}] \times x \left[ \frac{\text{meters}}{\text{unit}} \right];$$

(c) identifying an intersection point between at least two buffer circles; and (d) estimating the position of the transmitter based on the location of said intersection point.

In a further embodiment, the method wherein the plurality of wireless measurements are adjacent measurements.

In a further embodiment, the method wherein adjacent means adjacent in time or in location.

In a further embodiment, the method wherein the step of estimating the position is estimated by identifying a cluster of intersection points and circumscribing a circle around a polygon created from the cluster of intersection points, wherein the estimated position is within the circumscribed circle.

In a further embodiment, the method wherein the estimated position is estimated by plotting a location point within the circle.

In a further embodiment, the method wherein the plotted location point is plotted to create the shortest distance to each of the intersections within the circle.

In a further preferred embodiment, a method of estimating a position of a wireless transmitter comprising: collecting a plurality of wireless measurements between a transmitter and a receiver; drawing a buffer circle around a location of each wireless measurement, said buffer circle having a radius defined by a timing advance delay measurement collected by said receiver; plotting a plurality of buffer circles and identifying intersection points for adjacent measurements only; and estimating the position based on the intersection of timing advance delay measurements from said plurality of wireless measurements.

DETAILED DESCRIPTION OF THE EMBODIMENTS

Figure 1:
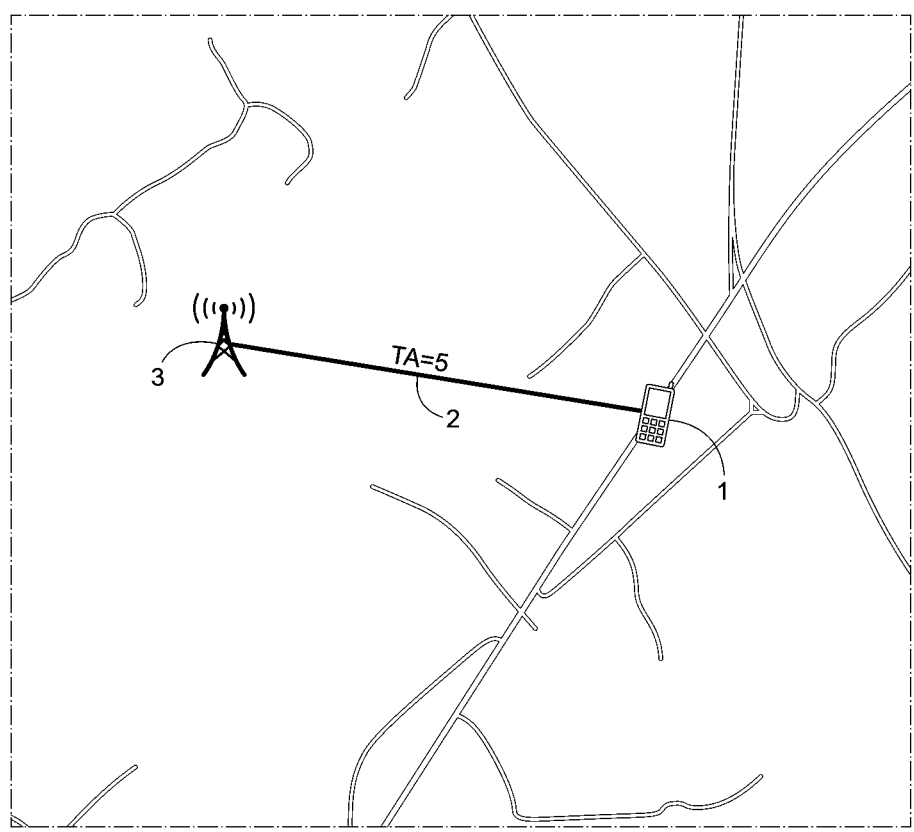
FIG. 1 depicts a single measurement received from a serving cell site. Depicted is a receiver, here a mobile device 1; a transmitter, here, a wireless base station 3; and the delay measurement 2 defined as a line drawn from the mobile device to the wireless tower with TA equal to 5.

The position of wireless transmitters has been historically estimated using various signal level values, which are impacted by fading, penetration losses, path obstruction, etc. Wireless transmitters may include cellular network base stations, two-way land mobile communication sites, broadcast transmitters, mobile radios, Internet of things (IoT) devices, and other similar systems which transmit signals. Accordingly, because of these various impacts, these estimations result in inaccurate position locations and imprecise identification of wireless transmitter locations, among other errors. Methods are needed to increase both the accuracy and precision in defining the location of a wireless transmitter. This location data has significant value to the industry. For example, the ability to identify both the existence of a wireless transmitter and to identify the location of that wireless transmitter location with greater precision can be a useful tool to allow wireless network operators to gain insights into the location of, for example, a competitor wireless base station location, containing the wireless transmitter, or to a transmitter in general. For infrastructure companies (i.e., those who make, install, or manage cellular network towers and rooftop locations) the embodiments can aid in financial valuation of existing towers (which house or hold one or more transmitters) and to identify potential locations to build new towers as well as the ability to visualize tower locations to secure rights based on the highest value locations.

Measuring the wireless signal (e.g., radio waves) travel time can give an indication of distance between a receiver and a transmitter. Here, a receiver is a wireless device (phone, tablet, computer, radio, other communication device, etc.), and the receiver is capable of defining its position, via longitude and latitude, while the transmitter has an uncertain position. Due to the finite speed of radio waves, transmitters in modern networks send "ahead of time" to arrive at the receiver at precisely the correct time to avoid interfering with transmissions in adjacent "time slots." This "timing advance" value corresponds to the distance between the transmitter and receiver, since a large distance requires earlier transmission in order to arrive at the receiver at the appropriate time. Aggregating and processing a number of timing advance measurements according to the methods described herein, combined with the known longitude and latitude of the receiver (wireless device) can accurately estimate the location of a transmitter.

Since Timing Advance (TA) is a delay measurement which indicates the incremental duration of signal propagation time, it is possible to translate this value into a distance measurement by multiplying it with the speed of light (c=299,792 m/s) with the generic assumption of free-space propagation and line of sight path. In Wideband Code Division Multiple Access (WCDMA) networks each TA unit is equal to 3.69 μs which yields a distance of 1,106 meters. In LTE networks each TA unit is equal to 0.52 μs which yields a distance of 156 meters of round-trip delay. Thus, the specific type of network as well as the network hardware implicate the distance within a delay measurement and thus the variable can be controlled based on the measurements taken. Certain hardware devices misrepresent the TA value and thus it is important that we compensate for these differences for optimal accuracy. Indeed, hardware implementation (in the form of chipsets) and software controlling them yield different conversion formulas from units of TA to units of meters or seconds. Certain hardware and software profiles can be created, even updated based on software updates, to allow for normalization of all data in the dataset.

For any given TA measurement value, the one-way distance can be computed from a transmitter to a receiver by taking half of the TA value expressed in distance (meters). FIG. 1 details an example scenario in an LTE network (TA unit equal to 1.56 meters) depicting the actual locations of the wireless base station (transmitter) 3 and the receiver (wireless device) 1 with a TA value of 5 recorded by the receiver. The distance between the two devices is calculated to be equal to ½×(5×156) or 390 meters. The transmitter 3 is the wireless base station, the receiver is a wireless device 1, such as a cell phone, a notebook, a computer, radio, and the like, which are known to those of ordinary skill in the art to be an electronic device having wireless receiving and/or transmitting capabilities. The TA line 2, is the distance between the transmitter 3 and the wireless device 1 at the moment of the measurement, where in the precise distance is adjusted based on the hardware and software on the device.

A single measurement with a TA received by a wireless device 1 is not sufficient to determine the location of the transmitter 3 since it only indicates that the transmitter 3 is "x" meters away from the device 1.

Figure 2:
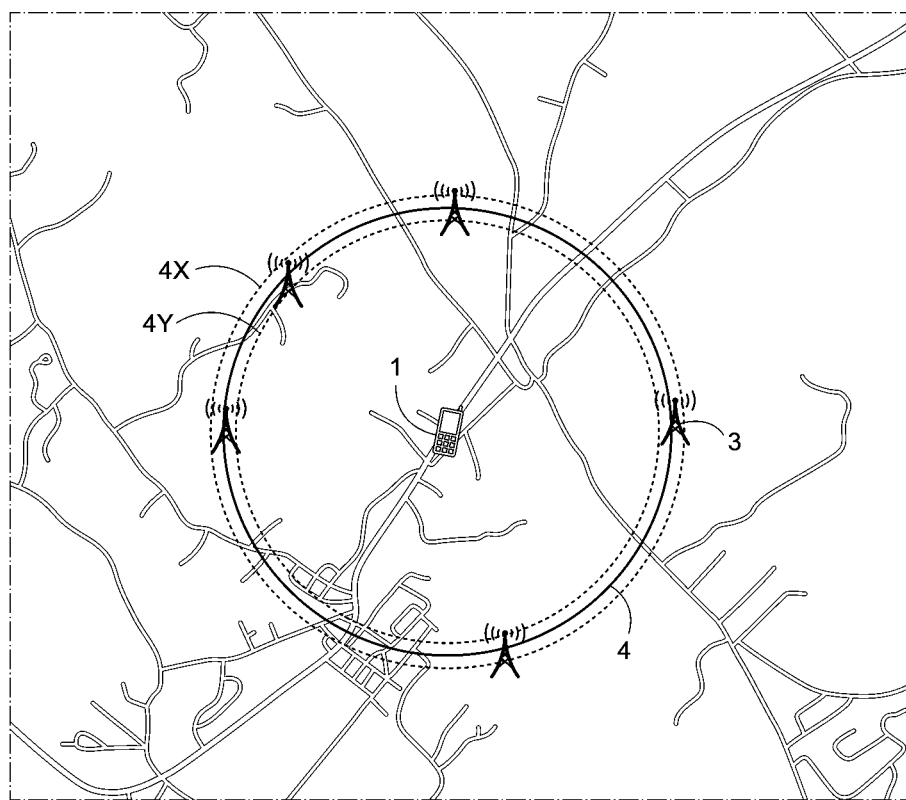
FIG. 2 depicts a buffer circle 4, with a radius equal to the received TA expressed as distance, drawn around a mobile device 1, with ½ TA offset buffer circles (4X and 4Y) drawn to account for the incremental difference between sequential TAs.

FIG. 2 depicts the example of a single mobile device 1 recording that an LTE transmitter 3 has requested the wireless device 1 to use TA=10 (equal to 780 meters) during its communication with the transmitter 3. The transmitter 3 can be anywhere on the edge of a buffer circle 4 centered at the wireless device's 1 location and a radius of 780 meters. To be more precise, buffer circle 4 is really a band between offset buffer circles (4X and 4Y), corresponding to a single TA value due to the incremental difference between sequential values (i.e. a TA=10 would be received by a mobile device which is anywhere between TA=10±½). Thus, when we don't know where a signal came from, we can take a wireless device 1 receives with a certain TA and generate a buffer circle 4 to yield the possible location of the transmitter 3, where the transmitter 3 should be located on the buffer circle 4, but its actual position is in a region related to ½ of TA, within a margin that is related to this ½ TA corresponding to the offset buffer circles of 4X and 4Y.

Figure 3:
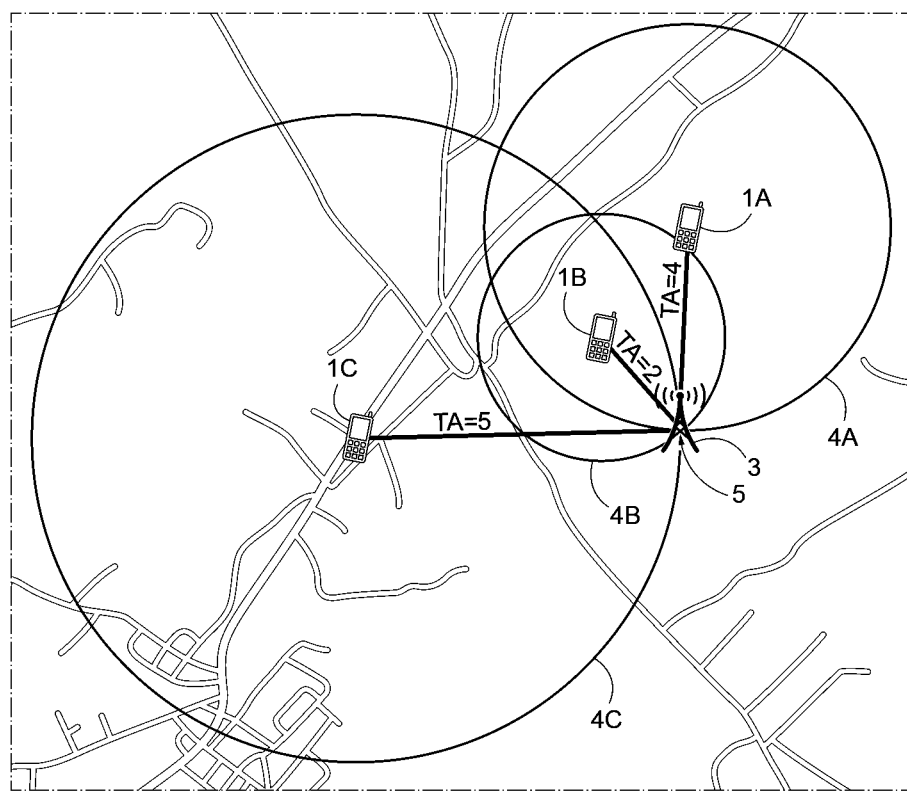
FIG. 3 depicts a wireless mobile device at three separate locations (1A, 1B, and 1C) and the overlapping buffer circles (4A, 4B and 4C), which intersect to give information regarding the position of a wireless tower.

Multiple measurements from the same transmitter 3 with TA values recorded by the receiver at different locations would yield different buffer circles, which should then intersect (or form an intersection point 5), which can be utilized to identify the location of possible transmitter 3 locations. When these buffer circles are overlaid, as depicted in FIG. 3, they can narrow down the location of the source transmitter 3 since, in the example, it can only be at the location where three or more buffer circles intersect 5. FIG. 3 particularly utilizes TA to show the three different locations (1A, 1B, and 1C) of a wireless mobile device, each has a different TA, with 1A having a TA of four, 1B having a TA of two, and 1C having a TA of five. These three overlapping buffer circles (4A, 4B, and 4C) utilize the radius of the TA expressed in meters. Here, in the simplified example, the three intersect at intersection point 5, which would be the only point that could be the source of the transmitted signals, and thus identify the transmitter 3 location. The other intersection points, which are not labelled, could not be the source of the transmission, this is because, not all of the transmissions would define a point of intersection with precision, even though, for example, certain intersections are within another buffer circle. The overlapping buffer circles (4A, 4B, and 4C) draw possible locations transmitter locations, which are actually just data points, and the more data points in a particular set increases the confidence of the estimated transmitter location.

Since a single signal wireless base station source can use multiple transmitters (with antennas at different horizontal azimuths, hardware configuration, etc.) the location determination is performed in a first phase, to provide a first location determination and then an optional second phase to fine-tune the first location determination. The phases include:

Phase I: Estimate geographic location of a signal source for a transmitter, e.g., one or all transmitters at the base station location.

Phase II: Fine-tune geographic location by estimating the signal source location for each transmitter, e.g., the transmitters at the wireless base station location.

Finally, we can utilize signal strength to identify the azimuth of a transmitter in either phase.

Phase I: Signal Source Geographic Location Estimation

Figure 4:
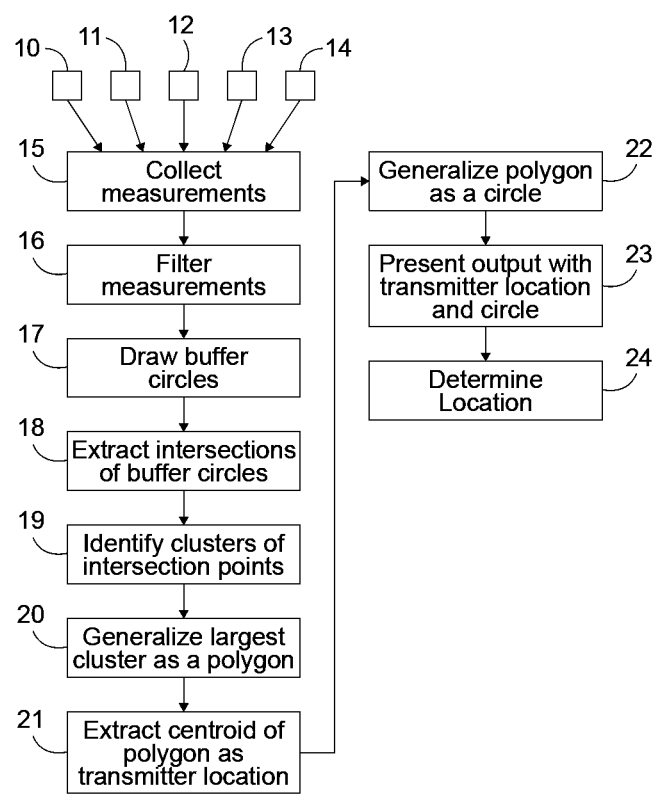
FIG. 4 depicts a flowchart of an embodiment of the cell site identification method for Phase I.

FIG. 4 details a flowchart showing the Phase I steps for estimating the initial geographic location of a single signal source is done as follows:

Step 1: Collect all wireless device measurements 15 (measurements are collected from one or more wireless devices 10, 11, 12, 13, and 14) and their location, and identifying a given signal source by its unique source ID. FIG. 1 identifies a mobile device 1, the TA 2, and the transmitter 3, where the wireless device measurements 15 include the TA data including the location and the TA value.

Step 2: Filter measurements 16 with at least N number of points for the lowest reported TA value. This step would exclude TA measurements with low sample counts that might be insufficient to reliably detect the location of the transmitter 3 or might have too many outlier points. In practice, the outlier measurements are those with high vertical and/or horizontal inaccuracies in reported geographic location (latitude/longitude) or incorrect TA values impacted by RF conditions or fast-moving mobile devices. Empirical tests have shown N 10 to be a good starting point to provide reliable data, however, a higher N value increases the reliability of the data, for example, wherein N is greater than 50, though samples of as few as three are possible.

Step 3: Draw buffer circles 17 centered at each measurement's location (latitude/longitude) with a radius equal to as $$\frac{1}{2} \times TA[\text{unit}] \times x \left[\frac{\text{meters}}{\text{unit}}\right]$$

where x represents the distance measurement for each unit of TA (e.g. approximately 156 meters for LTE measurements). This step is shown by FIGS. 1 and 2, with FIG. 1 being the TA, and FIG. 2 depicting the drawing of a buffer circle 4, with the radius as described herein, having a buffer between 4X and 4Y. The distance can be adjusted based on hardware and software implications from the mobile device (receiver).

Step 4: Extract the intersection of buffer circles 18 for each reporting mobile device and location with intersection performed on time-adjacent measurements sorted on measurement's recorded time stamp in ascending order. FIG. 3 provides a simple example of this step, with three measurements and three TAs, with the intersection point 5 being the point at which the three measurement locations intersect. In practice, there may not be a perfect intersection point 5, and thus a cluster is utilized in certain embodiments, of closely related intersection points. This step reduces the number of required intersections that need to be computed and ensures buffer circle intersection is performed on spatially separated measurements only. Indeed, as in FIG. 3, not all the intersections need to be computed, as only adjacent measurement intersections, i.e., those based on the recorded time stamp in ascending order are utilized in the calculations. Thus, the intersections between circles 4A and 4C will not be an adjacent measurement and are not utilized, only A to 4B and 4B to 4C are used.

Figure 5:
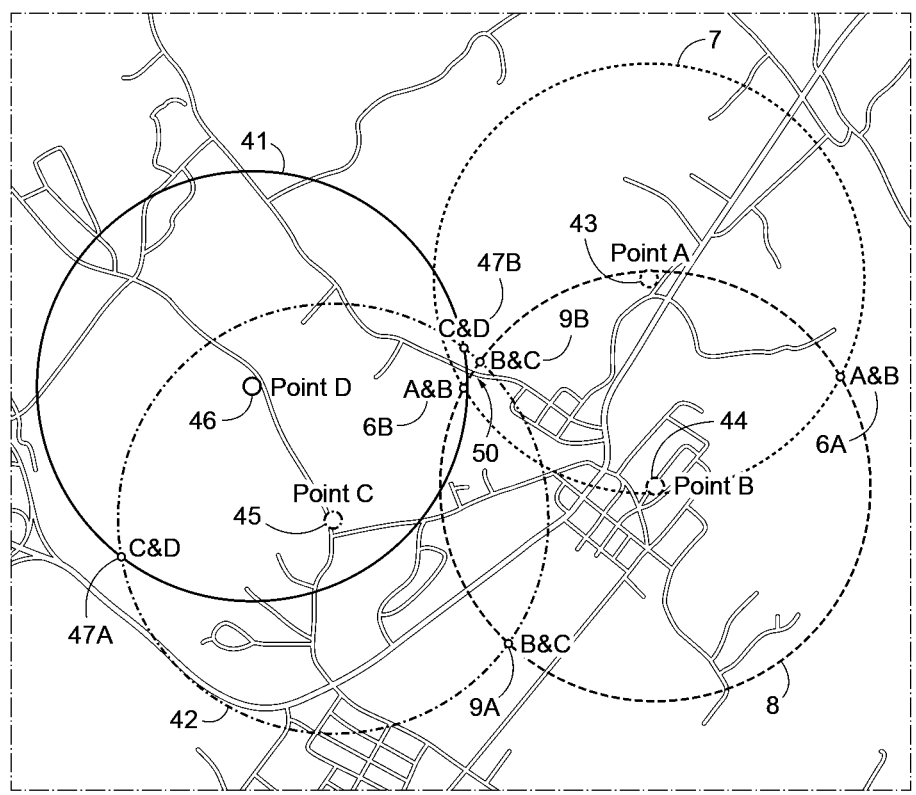
FIG. 5 depicts a wireless device at four different locations (Point A 43, Point B 44, Point C 45, Point D 46), and calculating intersection points between buffer circles (buffer circle A 7, buffer circle B 8, buffer circle C 42, buffer circle D 41), taken for time-adjacent measurements, namely between buffers A and B (intersections 6A and 6B), B and C (intersections 9A and 9B), and C and D (intersections 47A and 47B), resulting in a cluster 50 of intersections 5 which are a collection of measurements geographically collected within a predefined distance from each other.

FIG. 5 provides a further example showing measurement locations (Point A 43, Point B 44, Point C 45, and Point D 46) for a device reporting data along its travel path from Point A 43 to Point D 46. The buffer circles at each location 7, 8, 41, and 42 have a radius equal to the lowest recorded TA for a single transmitter expressed in meters. Also shown are the intersection points between reported adjacent measurements (A&B for Buffer A intersected with Buffer B 6A and 6B, B&C for Buffer B intersected with Buffer C 9A and 9B, etc.).

Here, unlike the simplified version in FIG. 3, the four buffer circles (7, 8, 41, and 42) don't perfectly intersect at a single point, and thus we mark a plurality of intersections (6B, 9B, and 47B) to define a cluster 50. However, the intersections are not marked for each and every possible intersection, as this would lead to thousands or millions of intersections, which is unnecessary and results in too much data. Instead, only the time-adjacent (i.e., sorted on the recorded timestamp) measurements are utilized. In the example given, the device is traveling in a clockwise pattern (A→B→C→D) and the intersections of the buffer circles are taken only at A&B, B&C, and C&D.

Step 5: Identify clusters of intersection points 19 with inter-point distance equal to a threshold D and a minimum of M points (sample locations). Thresholds D and M are set to values small enough to group densely located intersection points. Values for D and M were found empirically to be around D=30 meters and M=5 points in rural areas and around D=10 meters and M=10 points in suburban and urban areas, respectively.

Figure 6:
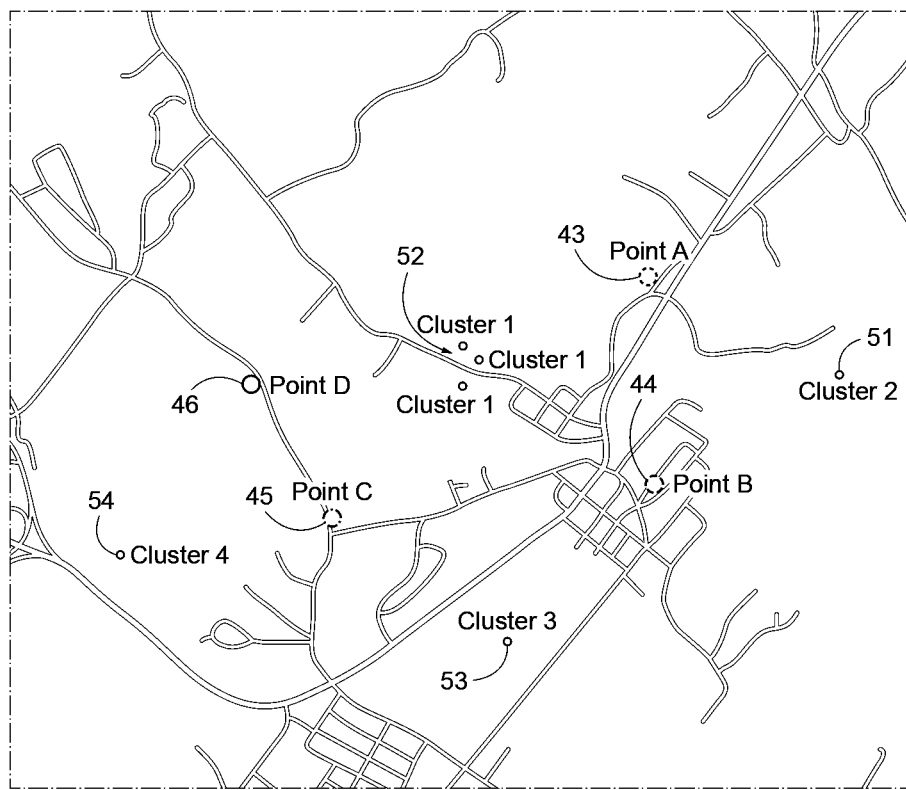
FIG. 6 takes the same data as FIG. 5 and removes the buffer circles to simply show the clusters 52 of intersection points on a map. Clusters are tagged based on the "Density-based spatial clustering of applications with noise" algorithm with a threshold inter-point distance of twenty meters and minimum number of points set to three. Cluster one 52 has the highest number of points of the four with remaining clusters (cluster two 51, cluster 3 53, and cluster four 54) with one point each.

FIG. 6 details an example of clusters of intersection points depicting buffer circle intersections (51, 52, 53, and 54). When clustered (i.e., grouped), intersections (51, 53, and 54) yield one point each per cluster (Cluster 2 51, Cluster 3 53, and Cluster 4 54), while Cluster 1 52 nets the highest number of intersection points. We use functions to allow us to cluster the points based on the proximity from one to another and based on the minimum number of points desired.

In particular, the cluster with the highest number of intersection points using the density-based spatial clustering of applications with noise (DBSCAN) algorithm with the D and M thresholds defined as per above. In FIG. 6, cluster one 52 is the cluster with highest number of intersection points.

Figure 7:
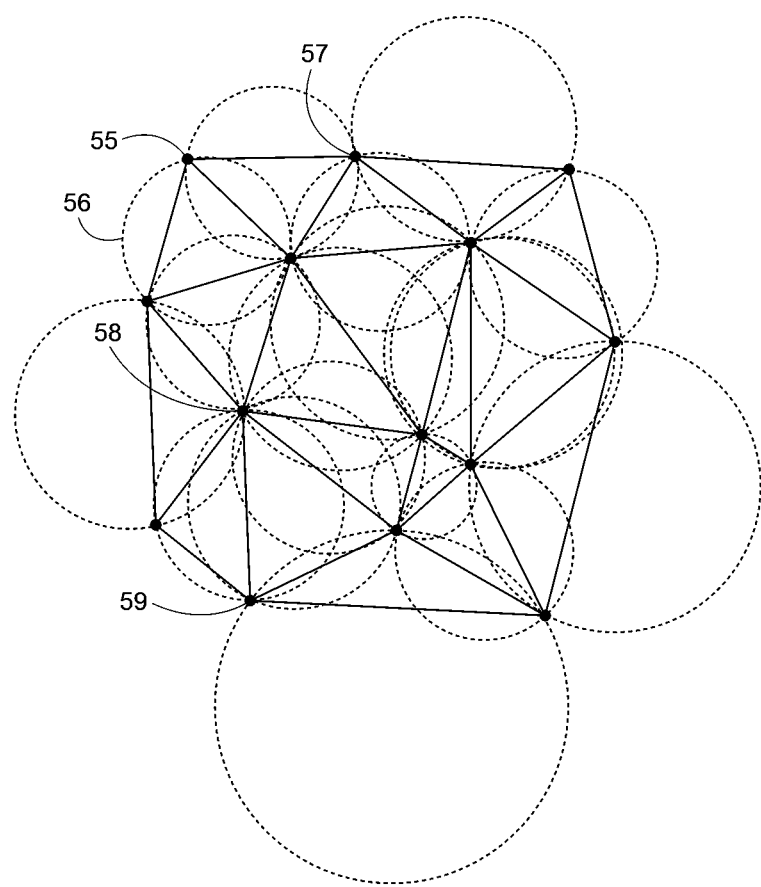
FIG. 7 depicts an example of a Delaunay triangulation drawn towards a plurality of points. The circumcircles 56 of the Delaunay triangles are utilized to produce a Voronoi diagram of intersection points (55, 57, 58, 59). Collapsing (merging) the created Delaunay triangles yields a single geometry (polygon) from the cluster of points, which can be utilized to represent the estimated location of a wireless base station and define the boundaries of a cluster.

Step 6: Generate largest cluster as a polygon 20 based on the Delaunay triangulation of points within the identified cluster. This step allows the representation of the intersection points with a single geometry feature. FIG. 7 details a generic example of creating circumcircles 56 of the Delaunay triangles to produce a Voronoi diagram of intersection points, yielding polygons created from points 55, 57, 58, and 59 using Delaunay triangulation. Collapsing (merging) the created Delaunay triangles yields a single geometry (polygon) from the cluster of points, which can be utilized to represent the estimated location of a wireless tower.

Figure 8:
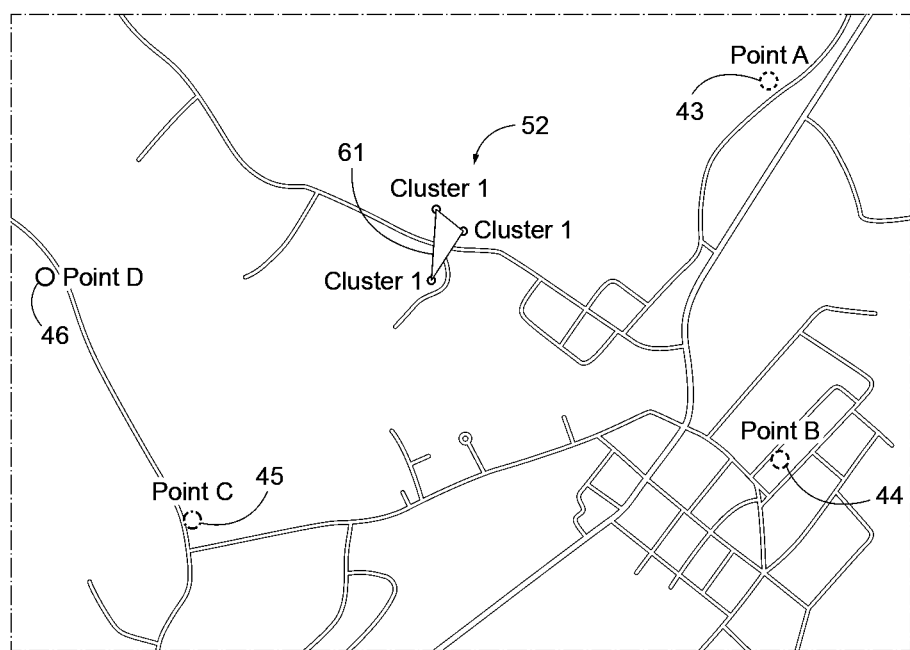
FIG. 8 depicts a sample geometric shape 61 drawn from points of Cluster one 52 using Delaunay triangulation, here a triangle is used from three points.

FIG. 8 depicts a sample geometric shape drawn from cluster 1 52 points. Because of the simple sample size, here the geometric shape 61 is a triangle is created from the three points. Accordingly, in FIG. 8, we create the polygon from the points and the Delaunay triangulation. For examples with many more data points, using the Delaunay triangulation methods, we aggregate all of the triangles into a shape and end up with a polygon of the minimum points.

Figure 9:
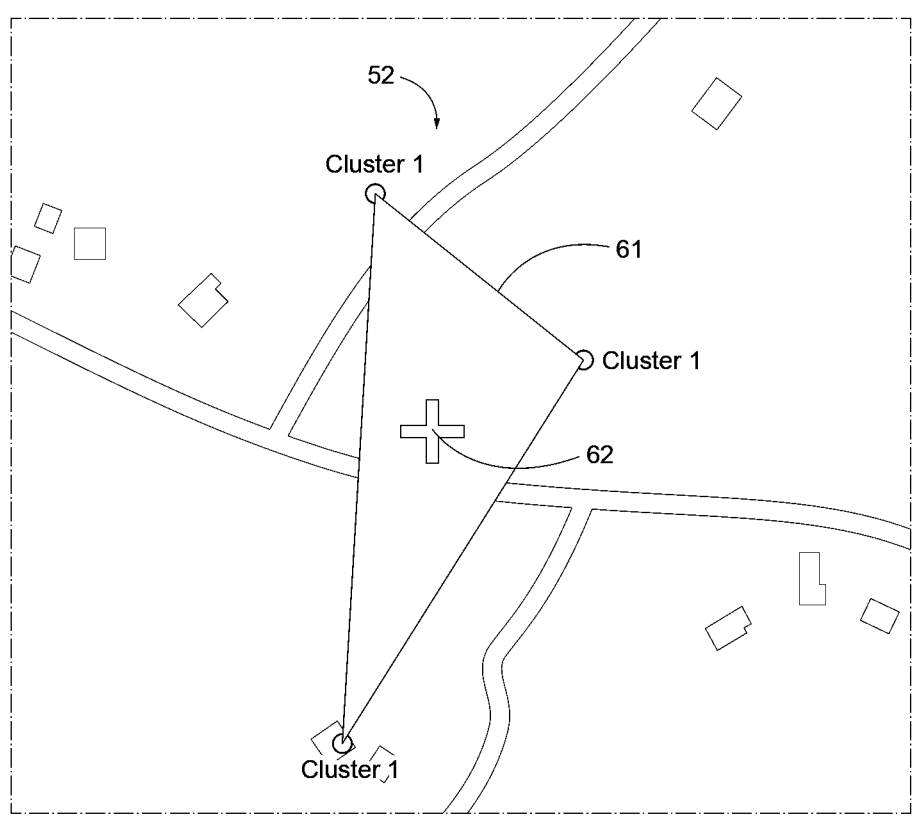
FIG. 9 provides greater detail of the geometric shape 61, a triangle, and showing the centroid 62 with a "+" symbol in the central portion of the triangle.

Step 7: Extract the centroid 62 of the generated geometry which represents the estimated location of the signal source 21. FIG. 9 details an example of the centroid 62 (shown as a + sign within the geometric shape 61, here a triangle) extracted for cluster 1 52 polygon per prior examples. The centroid 62 is calculated as an initial estimated location of the source wireless transmitter.

Figure 10:
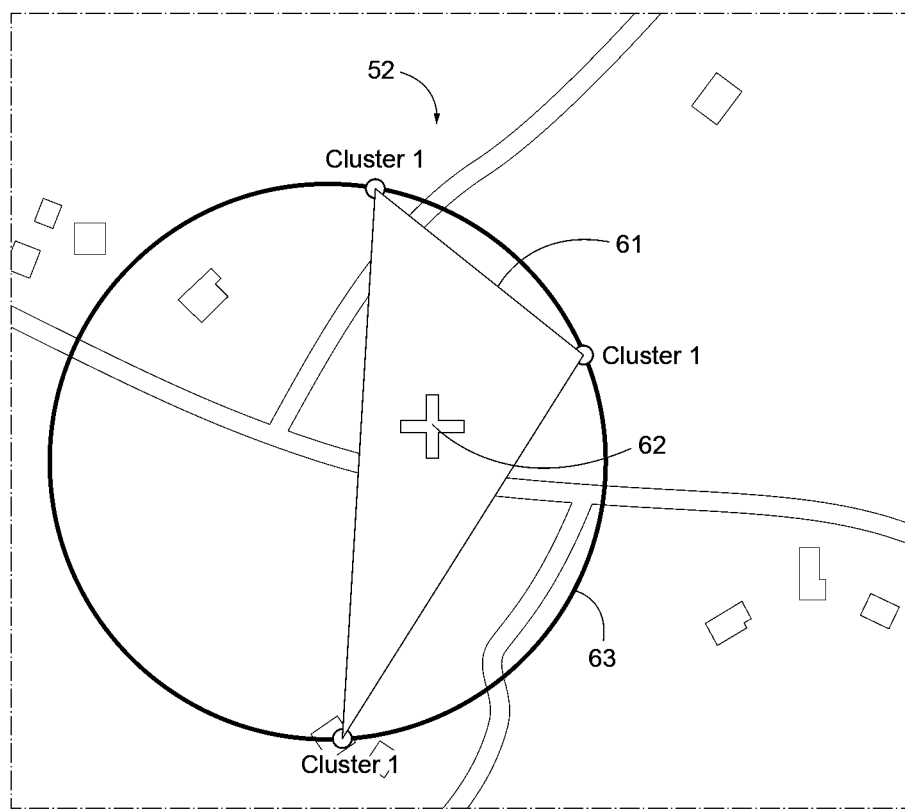
FIG. 10 depicts circumscribing the geometric shape 61 inside a circle 63, to represent a margin of error for the position of the wireless base station.

Step 8: (generalize polygon as a circle 22) by drawing a circle 63 around the centroid 62 as a confidence indicator of accuracy and/or precision. FIG. 10 details an example of the circle 63 enclosing the cluster 1 52 geometric shape 61 and the centroid 62. While the cell site is most likely within the geometric shape 61 itself, to enhance accuracy, we create a margin of error and thus the actual transmitter location is within the circle 63. Accordingly, the precise location is likely within the geometric shape 61, but the circle 63 represents a confidence of its actual location. However, the size of the circle 63 is not representative of a magnitude of confidence. Typically, the smaller the circle, the greater the confidence. However, here, it is the inverse, the smaller the circle, the less confidence, while the larger circle, the greater the confidence that a wireless base station is located within that circle. To put simply, a small circle means higher precision, while a larger circle means higher accuracy.

As in step 9, the circle 63 that circumscribes, is a simplified representation of the location of the wireless base station (i.e., present output with transmitter location and a circle 23). From this circle 63, we can determine a location 24, from our flowchart of FIG. 4. Thus, this circle can identify with high accuracy that a wireless base station is located within the circle 63.

Phase II: Signal Source Geographic Location Fine-Tuning

The estimated wireless transmitter location could be further improved by incorporating the previously calculated estimated location and recalculating the location based on more data or improved fitting of the data. For example, the estimated location could be run every month using measurements from the previous year. The new, improved estimated location could be the average of the old and new estimated site locations, or old and new locations could be weighted by the count of measurement samples or spatial diversity of measurement samples. The old location could also be the seed location in the initial step of the location estimation process. This data can be utilized to train a machine learning system which incorporates the data from all of the estimated locations and continually updates the locations upon the collection of more data. Notably, at some point, the calculated location is not modified, i.e., a consensus is determined. However, the calculation may still be rerun and a new location is only determined when the data shows a divergence from the prior consensus location. For example, the transmitter location may have been moved to a new tower, even a short distance away, which would be a divergence.

Figure 13:
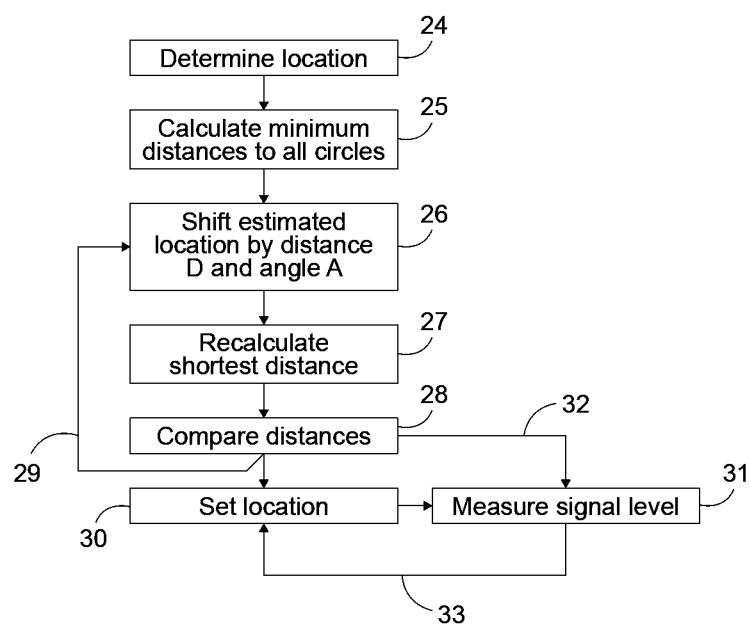
FIG. 13 defines a flowchart showing a Phase II optimization method to increase the precision of the location of the wireless base station, including the option to include measurement of signal level for increasing accuracy of the prediction, and specifically, where signal level can also assist in determination of the azimuth of a transmitter.

While the initial determination of a location 24 may be sufficient in many cases, in order to increase the precision of the estimated transmitter position, that is, to fine-tune the geographic location, modification can be utilized to alter the determined location 24. FIG. 13 details a flowchart showing the steps for fine-tuning the signal source's geographic location based on each transmitter's signal through an iterative process and is done as follows:

Step 1: Calculate the minimum distance D to all circles 25 from the signal source's initial determined location 24 found in Phase I (Loc_0) to all the buffer circles for all TA measurements grouped by each transmitter's unique ID.

Figure 11:
FIG. 11 depicts where the set of intersection points 73 within a cluster 72 leads to the drawing of the geometric shape 75, and then calculating the initial estimated wireless base station location 76. Drawn are also the shortest distances 74 from the initial estimated wireless base station location to each individual buffer circles 71.

FIG. 11 details an example of Loc_0 of the position of the wireless base station 76, marked with a "+" symbol, with the buffer circles 71, intersection points, e.g., 73, a geometric figure (triangle) 75 from the cluster of intersection points created from the buffer circles 71 at the intersection points clustering 72. The estimated initial wireless base station location 76 is then marked with minimum/shortest distances 74 to each of the buffer circles 71, as depicted by the dotted lines in FIG. 11.

We know that the initial estimated transmitter location might not be the best location—since all buffer circles do not intersect at the same intersection point. The goal is to identify, from the cluster of intersection points, the location closest to all the buffer circles.

Figure 12:
FIG. 12 depicts the spatial shift of the initial estimated transmitter (wireless base station) position by a predefined distance and angle to a new location 77 which could potentially lead to shorter distances 74 to all the buffer circles 71 when compared to the initial estimated location.

Step 2: Shift the estimated wireless base station location 26 Loc_0 (76 in FIG. 11) by a distance D (a set distance by the user) at an azimuth 0° from the initial position to generate a new location (77 in FIG. 12). Thus FIG. 12 depicts that the initial location 76 (from FIG. 11) is modified to a new location 77, and then the process is recalculated again using the distances 74 to all the buffer circles 71. And we recalculate and the redo the calculation if the new location gives a better (shorter) distance than the prior location. Then we take this as the new estimated location of the transmitter, until we find a better result. Ultimately, we repeat until there is no shorter distance. We can use the prior calculated locations in the data set, ultimately as well to train a machine for machine learning of the iterative process in calculating the transmitter location.

Step 3: Recalculate 27 the shortest distance from the new location 77 to all the buffer circles grouped by each transmitter's unique ID.

Step 4: Compare the distances 28, wherein, if the calculated distance in Step 3 is smaller than one calculated in Step 2 then set location 77 as the new estimated location of the signal source. Otherwise, shift the initial estimated location of the signal source by D meters and +A degrees of azimuth as calculated in the recalculation, and return (iterative process) 29 to Step 2 to place a new position for calculating the shortest distance.

Step 5: Steps 3 and 4 are repeated iteratively 29 until the calculated distance remains unchanged upon which the distance shift of the estimated location is done in smaller increments of D and A down to predefined thresholds. With appropriate computing power, this can be done repeatedly in fractional seconds, allowing for computation of transmitters in real-time. This can be especially helpful in circumstances where the transmitter may be at a particular location for only a small amount of time, but where the calculation of the location at that time is necessary. For example, a movable tower might be in use, or a mobile transmitter/transceiver with a vehicle, which is communicating with other mobile devices or transceivers.

Step 6: When calculations yield no reduction in calculated distances, then the last location is considered the fine-tuned signal source location 30. This location can then be set as a confirmed location.

Figure 16:
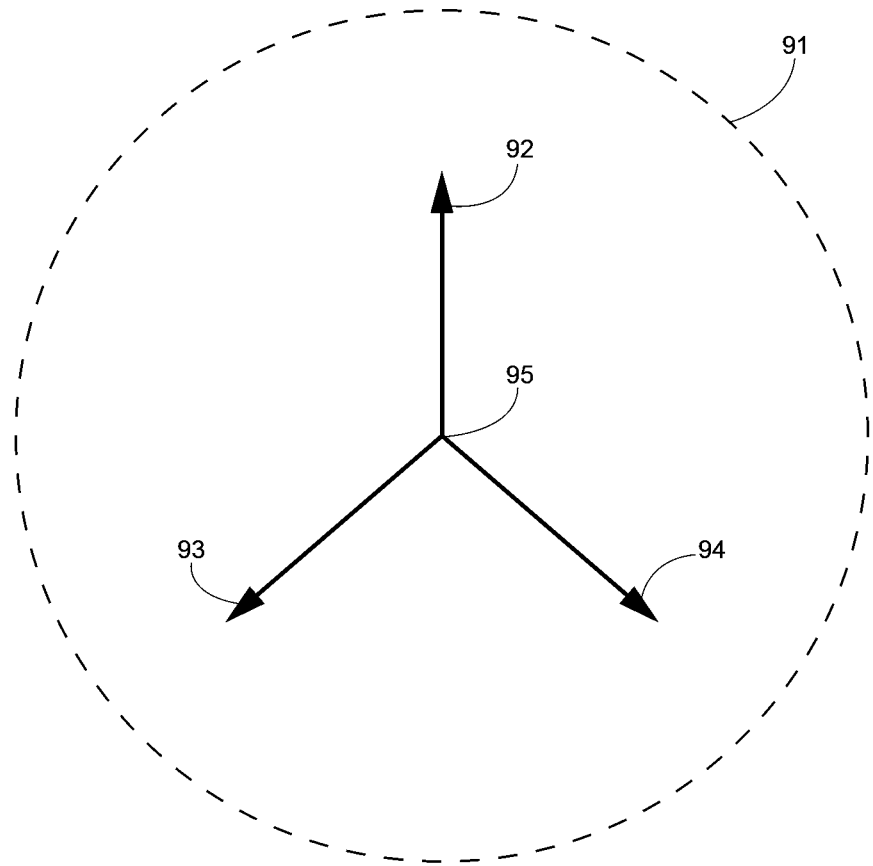
FIG. 16 details the azimuth of the transmitter, typically at a spread of about 120 degrees, showing three different transmitters (92, 93, and 94) with different directions at a base station 95, encircled by a buffer circle 91.

Step 7: Measured signal level 31 at the location of each transmitter's cluster may be used to further improve the accuracy and precision of the estimated signal source location. It can also be used to estimate the azimuth of individual transmitter's antenna in relation to the physical location of the cell site. This is detailed in greater detail in FIG. 16, where several transmitter antennas 92, 93, and 94 are located on a tower 95 and the specific azimuth of the particular transmitter antenna is directional within the buffer circle 91. By using the signal level, the particular azimuth of the transmitter may also be determined. For example, a moving receiver can identify different signal levels along a path, and once the location is confirmed, the data regarding signal level can outline the azimuth, with its directional reach, typically the antenna (e.g., 92), which is indicated by an arrow, would have a reach of 120 degrees, approximately 60 degrees on each side of the arrow. The signal being strongest in the direction of the antenna's main beam (indicated by the azimuth arrow) and reduced at the edges of the 120° reach.

Thus, incorporating signal level measurements 31 can further improve the precision and accuracy of the estimated source transmitter location 33 since a degrading signal level could indicate the departure from the transmitter's location or antenna's main beam path. In particular, this can yield the directional aspect of the transmitter antenna and such directional information can be included within the information regarding the transmitter.

These steps are outlined by the flowchart of FIG. 13, including the iterative process 29, to continually recalculate the location until a best fit and location is estimated based on the provided data. As data is modified, i.e., the set is an open set (which brings in new or additional data), the transmitter location can be continually modified until consensus is confirmed.

Figure 14:
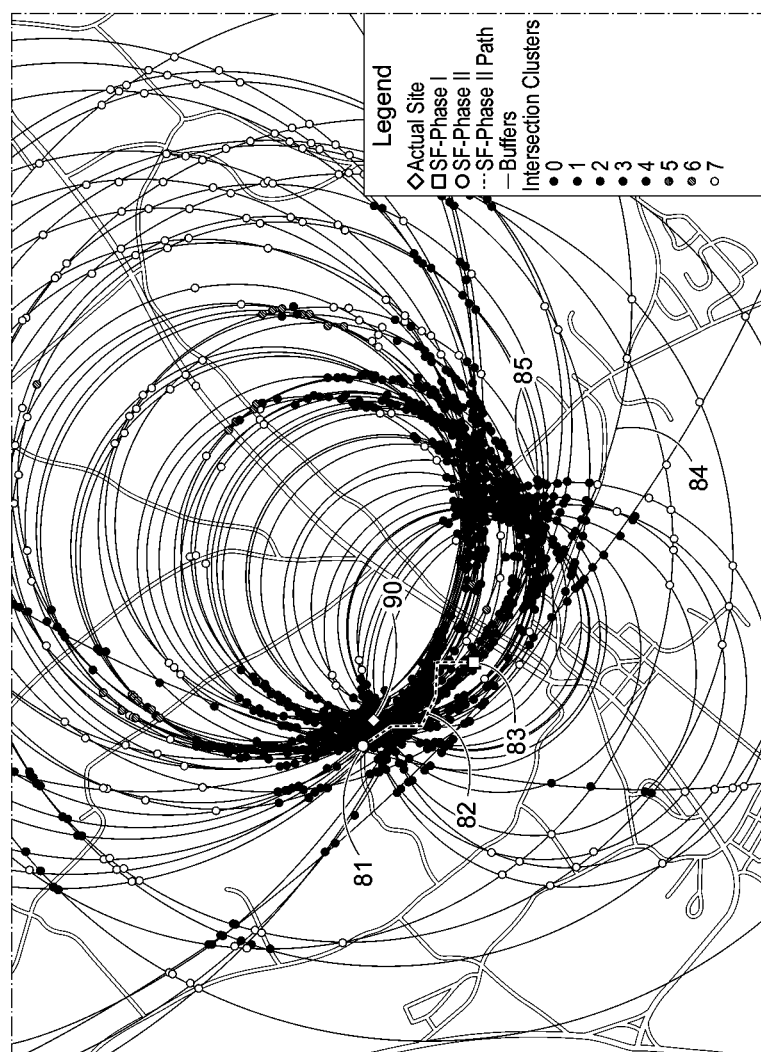
FIG. 14 depicts an example of Phase I and Phase II results showing the initial predicted signal source location 83, final predicted signal source location 81, and the actual signal source location 90 along with the buffer circles 84 and their intersections 85 (clustered based on inter-point distance) and the iterative path 82 taken by the iterative methods detailed herein.

Moving towards real data examples, FIG. 14 details an example of a cluster of collected measurements 85 and the corresponding buffer circles 84 attached thereto. An initial location was determined (point 83), from the cluster of collected measurements 85. The initial estimated position 83 of the wireless transmitter was then fine-tuned using the iterative process and the path of the estimated wireless tower positioning is depicted (line 82), ending with a final predicted transmitter location (point 81). The final estimated transmitter location is adjacent to the actual location (point 90), but this figure identifies the improvement in the position garnered by using the iterative process to identify the location.

Figure 15:
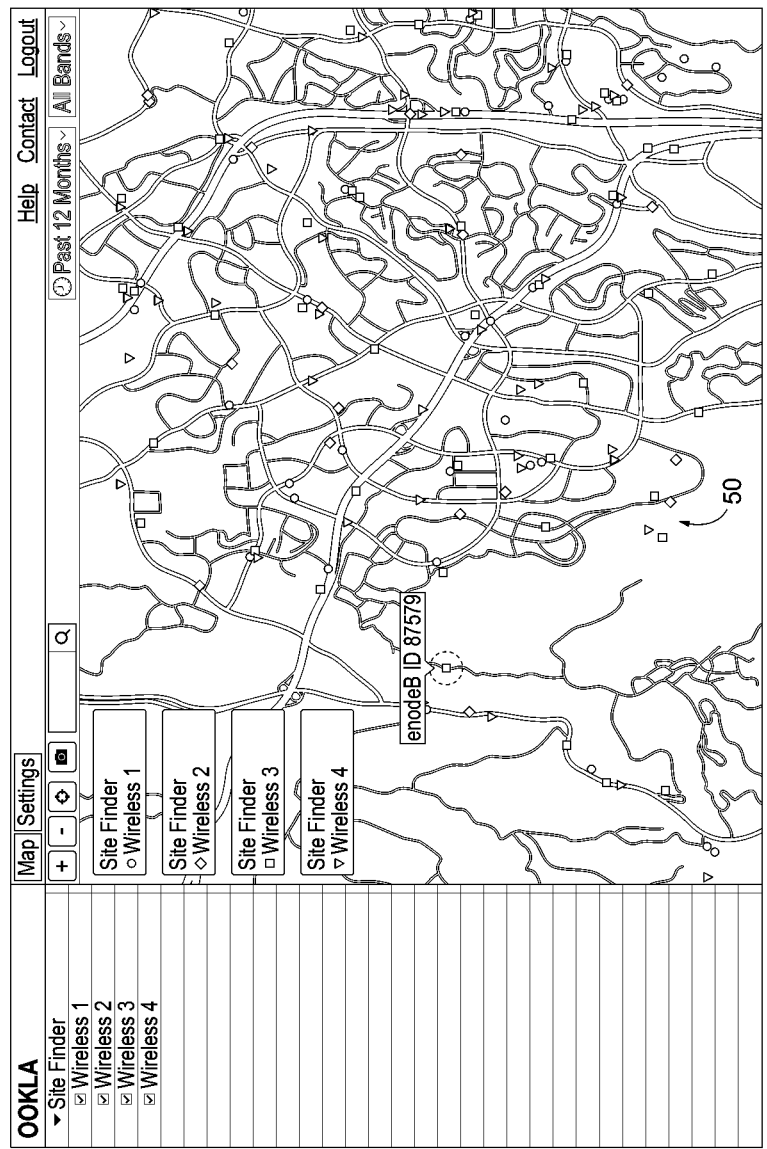
FIG. 15 depicts an example of the embodiment of the above approach in a Cell Analytics Web portal GUI. In this view, the estimated location of cellular network wireless base stations is indicated by points on the map, with the legend showing different base station points, as well as a cluster 50. The source measurements are collected in the background from users of the Speedtest application. This Web portal GUI allows for representation with a Web-based portal to view estimated cellular network wireless base station locations with greater precision than existing methodologies.

FIG. 15 details a Web GUI view of a plurality of wireless base stations which are calculated using the methods described herein. This allows for a user to identify the location of the transmitters or towers providing service in own network, the transmitter, or towers of other service providers, and to better identify positions of need or value to improve wireless service.

In certain applications, the methods, whether using Phase I alone, or with Phase II can be used to quickly determine and identify a transmitter location. Based on the TA data, the azimuth of the transmitter antenna can also be estimated. In certain applications, a transmitter may be stationary (or even moving) for only a few seconds or minutes. However, it may be necessary to calculate that point to use as a reference point for other devices communicating with that transmitter.

Accordingly, the methods, having been described herein, teach those of skill in the art new methods for estimating the position of a wireless transmitter using TA data. Those of skill in the art will recognize that routine and understood aspects of the invention may have been generalized or omitted as would be understood by those of ordinary skill in the art, and that the methods may be modified to incorporate known and understood elements without modifying the scope of and inventive nature of the methods.

What is claimed is:

1. A method of estimating a position of a wireless transmitter comprising:
   a. collecting a plurality of wireless measurements between the wireless transmitter and a receiver, each of said wireless measurements comprising a delay measurement (TA value) between the wireless transmitter and the receiver and a receiver location;
   b. drawing a buffer circle around each of the receiver location, with the buffer circle having a radius equal to $$\frac{1}{2} \times TA[\text{unit}] \times x \left[ \frac{\text{meters}}{\text{unit}} \right],$$

where x represents a distance measurement for each unit of TA value;
   c. extracting intersection points between adjacent wireless measurements;
   d. identifying at least one cluster of intersection points from step (c);
   e. identifying a cluster with a highest number of intersection points; and
   f. determining an initial estimated location of the wireless transmitter from the cluster with the highest number of intersection points.

2. The method of claim 1 further comprising:
   e1. immediately after step (e), generating a polygon corresponding to the cluster with the highest number of intersection points from step (e);
   e2. extracting a center from the polygon of step (e1);
   e3. circumscribing the polygon; and
   e4. determining a first initial estimated location of the wireless transmitter, corresponding to a location within the circumscribed polygon.

3. The method of claim 2 further comprising the steps:
   e5. calculating minimum distances from the first initial estimated location to all the buffer circles within the cluster with the highest number of intersection points;
   e6. shifting the first initial estimated location by a distance D and an angle A to a new location and recalculating the distances to all the buffer circles within the cluster with the highest number of intersection points;
   e7. comparing the calculated distances between step (e5) and step (e6); and
   e8. setting a second new location where the second new location has a shorter distance to all buffer circles than the distance from the first initial estimated location to all buffer circles.

4. The method of claim 3 wherein in step (e8) the new location further measures a signal level and modifies the new location based upon a measured signal level.

5. The method of claim 2 wherein the polygon is drawn by connecting the intersection points in said cluster having the highest number of intersection points.

6. The method of claim 1 further comprising wherein the intersection points have an inter-point distance equal to a threshold D and a minimum of M points.

7. The method of claim 6 wherein the values for D and M are D=30 meters and M=5 points.

8. The method of claim 6 wherein the values for D and M are D=10 meters and M=10 points.

9. The method of claim 1 wherein the TA value is modified based on hardware or software of the receiver.

10. The method of claim 1 wherein the TA value reported by the receiver is specific to a device manufacturer, chipset, and software release, wherein a unique profile normalizes the TA value reported.

11. The method of claim 1 wherein the plurality of wireless measurements includes a signal level.

12. A method of estimating a position of a wireless transmitter comprising:
  a. collecting a plurality of wireless measurements between a transmitter and a receiver, each measurement comprising a position of the receiver and a TA value;
  b. for each of the plurality of wireless measurements, drawing a buffer circle around the position of the receiver, wherein the buffer circle has a radius equal to $$\frac{1}{2} \times TA[\text{unit}] \times x \left[ \frac{\text{meters}}{\text{unit}} \right];$$

c. identifying intersection points between at least two buffer circles; and
  d. estimating the position of the transmitter based on locations of said intersection points by identifying a cluster of intersection points and circumscribing a circle around a polygon created from the cluster of intersection points, wherein the estimated position is within the circumscribed circle.

13. The method of claim 12 wherein the plurality of wireless measurements are adjacent measurements.

14. The method of claim 13 wherein adjacent means adjacent in time or in location.

15. The method of claim 12 wherein the estimated position is estimated by plotting a location point within the circle.

16. The method of claim 15 wherein the plotted location point is plotted to create a shortest distance to each of the intersections within the circumscribed circle.

17. A method of estimating a position of a wireless transmitter comprising:
  collecting a plurality of wireless measurements between a transmitter and a receiver;
  drawing a buffer circle around a location of each wireless measurement, said buffer circle having a radius defined by a timing advance delay measurement collected by said receiver;
  plotting a plurality of buffer circles and identifying intersection points for adjacent measurements only; and
  estimating the position based on the intersection of timing advance delay measurements from said plurality of wireless measurements by identifying a cluster of intersection points and circumscribing a circle around a polygon created from the cluster of intersection points, wherein the estimated position is within the circumscribed circle.

* * * * *